(12) United States Patent
Samukawa et al.

(10) Patent No.: US 7,446,159 B1
(45) Date of Patent: Nov. 4, 2008

(54) CURABLE RESIN COMPOSITION

(75) Inventors: Hiroshi Samukawa, Tochigi (JP);
Kouki Hatsuda, Tochigi (JP); Yoshito Ikeda, Tochigi (JP); Hisashi Ando, Tochigi (JP); Norikazu Yamamoto, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 0 days.

(21) Appl. No.: 11/902,286

(22) Filed: Sep. 20, 2007

(51) Int. Cl.
*C08F 222/14* (2006.01)
*C08F 2/46* (2006.01)

(52) U.S. Cl. .................. 526/284; 526/292.3; 526/320; 522/181; 522/183

(58) Field of Classification Search ................ 522/181, 522/183; 526/284, 292.3, 320
See application file for complete search history.

(56) References Cited

U.S. PATENT DOCUMENTS 5,502,139 A * 3/1996 Toh et al. ................... 526/284

FOREIGN PATENT DOCUMENTS

| JP | A 2002-293762 | 10/2002 |
|---|---|---|
| JP | A 2004-015063 | 1/2004 |

\* cited by examiner

*Primary Examiner*—Fred M Teskin
(74) *Attorney, Agent, or Firm*—Oliff & Berridge, PLC

(57) ABSTRACT

A resin composition having a viscosity suitable for encapsulating optical devices such as light-emitting devices is provided. Specifically, the cured product of the resin composition has a refractive index greater than or equal to that of epoxy resins, exhibits excellent heat resistance and light resistance, and has thermal stress relaxation properties. The curable resin composition contains a fluorene group-containing acrylate or methacrylate represented by the following formula and a specific monofunctional acrylate or methacrylate:

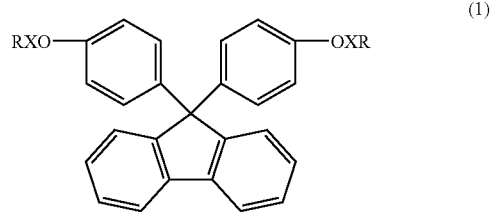

(1)

wherein X is —$(CH_2CH_2O)_n$— or —$(CH_2CH_2O)$—$CH_2CH(OH)CH_2O$— with n being 1 to 5 and R is an acrylic or methacrylic group.

10 Claims, 1 Drawing Sheet

[Fig. 1]

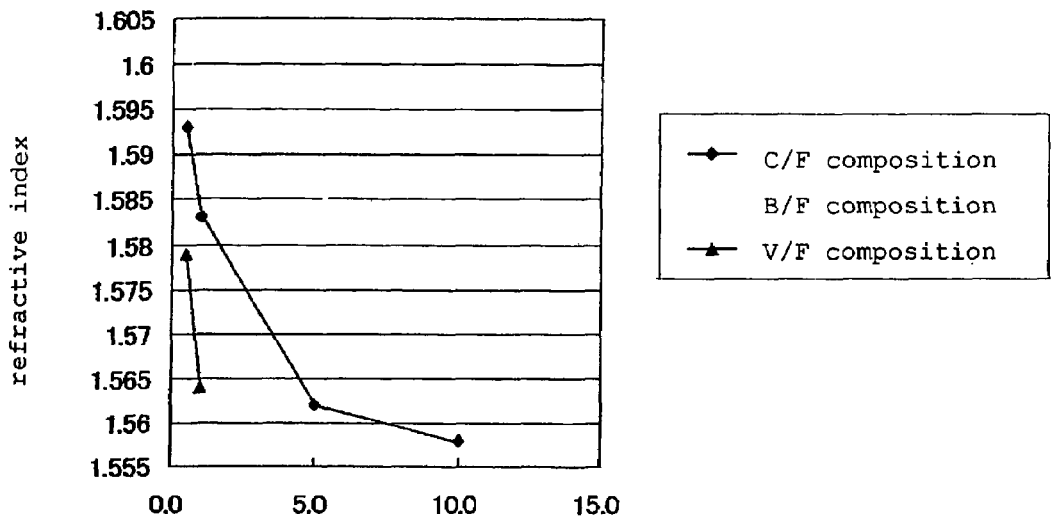

the mixing ratio of the monofunctional acrylate
to the fluorene group-containing acrylate (weight)

$\begin{pmatrix} \text{F: 9,9-bis(4-(2-acryloxyethoxy) phenyl)fluorene} \\ \text{C: paracumylphenoxyethyl acrylate} \\ \text{B: 2-(2-acryloxyethoxy)biphenyl} \\ \text{V: phenoxyethyl acrylate} \end{pmatrix}$

[Fig. 2]

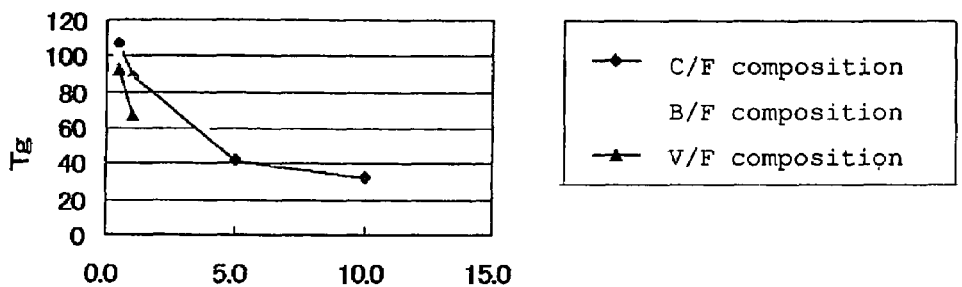

the mixing ratio of the monofunctional acrylate
to the fluorene group-containing acrylate (weight)

$\begin{pmatrix} \text{F: 9,9-bis(4-(2-acryloxyethoxy) phenyl)fluorene} \\ \text{C: paracumylphenoxyethyl acrylate} \\ \text{B: 2-(2-acryloxyethoxy)biphenyl} \\ \text{V: phenoxyethyl acrylate} \end{pmatrix}$

CURABLE RESIN COMPOSITION

BACKGROUND OF THE INVENTION

1. Field of the Invention

The present invention relates to a curable resin composition useful for encapsulation or the like of optical devices such as light-emitting devices.

2. Description of the Related Art

Traditionally, bisphenol A glycidyl ether type epoxy resins are used for encapsulating LEDs. However, such resins exhibit inferior heat resistance and light resistance (in particular, with regard to resistance to both UV and blue light). Hence, when these resins are used in high-intensity LEDs, UV LEDs, or the like, the resins are discolored by the heat and light emitted from the LEDs.

Therefore, a problem exists in that the luminance of LEDs varies over time.

In response to this problem, highly transparent epoxy resins have been developed. However, the heat resistance and light resistance of such resins are still not satisfactory.

In view of the above, gel-type silicone resins have been used in high-intensity LEDs as they exhibit excellent heat resistance and light resistance when compared with epoxy resins.

However, gel-type silicone resins have the following problems.

First, the surface of these silicone resins is sticky, so that dust and dirt easily adhere thereto. Therefore, at present, the application of these silicone resins is limited to use as a resin for filling the gap formed after the dome portion of an LED, where the dome portion functions as a lens, is joined to the base of an LED chip, and to use as an encapsulating resin when an LED is surface mounted.

Second, since the refractive index of the silicone resins used falls within the range of 1.41 to 1.51 and is lower than that of epoxy resins, the silicone resins reduce the light extraction efficiency of the LEDs that include such. Specifically, in high intensity LEDs, a sapphire substrate is often used as the chip substrate thereof, and a method in which the light is extracted from the sapphire substrate side of the high intensity LEDs is usually therefore employed. The refractive index of sapphire is 1.76. Therefore, in order to efficiently extract light from the sapphire substrate into an encapsulating resin, it is preferable that the refractive index of the encapsulating resin be close to the refractive index of sapphire, i.e., 1.76. However, among the silicone resins generally used, dimethyl silicone resin has a refractive index of 1.41. Furthermore, diphenyl dimethyl-based and phenyl methyl-based silicone resins, into which a phenyl group is introduced to increase the refractive index thereof, have a refractive index of approximately 1.51. Therefore, the refractive index of such silicone resins is lower than that of epoxy resins which have a refractive index in the range of 1.53 to 1.57. Therefore, when a silicone resin is used as the encapsulating resin for high-intensity LEDs, it is inevitable that the light extraction efficiency of such is lower than that which is achieved when an epoxy resin is used.

Third, since the silicone resins used in electronic materials are of an addition reaction type and are two-part resins, the two parts are required to be mixed immediately prior to use. Generally, the two parts are mixed using a static mixer. However, this mixer can mix only relatively low viscosity materials, and therefore it is difficult to obtain a resin composition having a sufficiently high viscosity after the mixing of the two parts. Hence, such resins cannot be molded into a predetermined lens shape, and a lens function cannot be imparted to the encapsulating resins.

Among the problems in association with the silicone resins, the problem of their refractive index may be solved by a technique proposed in Japanese Patent Application Laid-Open No. 2004-15063. Specifically, in this technique, the refractive index of a resin composition is increased by adding fine particles of titanium oxide, zirconium oxide, zinc oxide, or the like having a high refractive index to the resin. However, in order to increase the refractive index of the silicone resins to a level that is greater than that of epoxy resins by using this technique, at least 10 to 40% by volume of the fine particles must be added thereto. Unfortunately, the addition of these fine particles tends to reduce the transparency of the silicone resins. Moreover, it is difficult to obtain the level of fluidity necessary to enable the silicone resins to be used as an encapsulating resin. Furthermore, there has also been an attempt to improve the transparency of silicone resins using fine particles called single-nano particles. However, the cohesive force of ultrafine particles of single-nano size is very strong, and therefore it is very difficult to uniformly disperse the ultrafine particles within a resin without forming secondary aggregated particles. Therefore, a technology for encapsulating LEDs in a resin containing such fine particles has not yet been practically realized.

Meanwhile, the use of a fluorene group-containing monoacrylate as a high-refractive index resin used in the manufacture of an optical antireflective film has been proposed in Japanese Patent Application Laid-Open No. 2002-293762. This compound may also be considered for use as an encapsulating resin for LEDs.

However, since fluorene group-containing monoacrylates have very high viscosity, its handleability as an encapsulating agent is poor. When a low-viscosity diluent such as 2-hydroxyethyl acrylate is added to a fluorene group-containing monoacrylate, the viscosity of the composition can be reduced. However, a problem arises in that the refractive index of the final resin is also reduced by use of the diluent. Furthermore, this composition becomes very hard once the curing process is completed. Hence, when the composition is used as an encapsulating resin for LEDs, thermal stress may cause problems such as peeling of the resin away from the LED chip, breakage of the chip, breakages in the wiring, and the like.

SUMMARY OF THE INVENTION

In view of the problems associated with conventional technology, it is an object of the present invention to provide a resin composition having a viscosity suitable for forming an encapsulating resin for LEDs. Specifically, the cured product of the resin composition has a refractive index that is greater than or equal to that of epoxy resins and exhibits excellent heat resistance and light resistance, and the resin composition has an appropriate viscosity. In addition to this, in an LED encapsulated with the resin composition, the hardness of the cured product thereof is reduced to the extent that failures such as peeling of the encapsulating resin, breakage of the LED chip, and breakages in the wiring do not occur. Moreover, it is another object of the present invention to provide a cured product of the resin composition and an optical device such as a light-emitting device encapsulated with the cured product.

The present inventors have found that a resin composition composed of a specific difunctional acrylate or methacrylate containing a fluorene-group and a specific monofunctional acrylate or methacrylate serves as a one-part curable resin composition having an appropriate viscosity. The inventors have also found that the refractive index of the cured product of the resin composition is greater than or equal to that of epoxy resins, being 1.55 or greater, and that the cured product exhibits excellent heat resistance and light resistance and has a hardness that is suitable for use as an encapsulating resin. Therefore, the aim of the present invention has been achieved.

Accordingly, the present invention provides a curable resin composition comprising a fluorene group-containing acrylate or methacrylate represented by the following formula (1) and a monofunctional acrylate or methacrylate represented by the following formula (2) or (3):

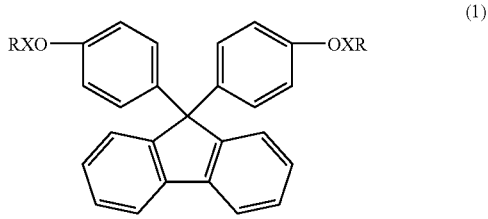

wherein X is —(CH$_2$CH$_2$O)— or —(CH$_2$CH$_2$O)—CH$_2$CH(OH)CH$_2$O— with n being 1 to 5 and R is an acrylic or methacrylic group;

 (2)

wherein A is an acrylic or methacrylic group, X is a phenyl group, a cumylphenyl group, a biphenyl group, a terphenyl group, or a polycyclic aromatic hydrocarbon group, and Y is —(CH$_2$CH$_2$O) n— or —(CH$_2$CH$_2$CH$_2$O)$_n$ with n being 1 to 5 or —(CH$_2$CH$_2$O)$_{n1}$— (CH$_2$CH$_2$CH$_2$O)$_{n2}$— with n1+n2 being 2 to 5; and

 (3)

wherein A is an acrylic or methacrylic group, X is a phenyl group, a cumylphenyl group, a biphenyl group, a terphenyl group, or a polycyclic aromatic hydrocarbon group, Y is —(CH$_2$CH$_2$O)$_n$— or —(CH$_2$CH$_2$CH$_2$O)$_n$ with n being 1 to 5 or —(CH$_2$CH$_2$O)$_{n1}$— (CH$_2$CH$_2$CH$_2$O)$_{n2}$— with n1+n2 being 2 to 5, R is CH$_3$, Br, or I, and m is 1 to 6.

Moreover, the present invention provides a cured product formed by curing the curable resin composition, and in particular, provides an optical device such as a light-emitting device encapsulated with the curable resin composition.

According to the present invention, the following effects can be obtained.

First, the resin composition of the present invention is a one-part resin composition which can be easily cured by applying heat or UV light thereto, and therefore there is no limitation on the pot life of such. Furthermore, the viscosity of the resin composition can be adjusted to a value that is suitable for any particular application. Therefore, the resin composition of the present invention exhibits excellent handleability.

Second, the cured product of this resin composition has a non-sticky dry surface and has a self shape-retaining property. Therefore, this cured product can exhibit a lens function in addition to an encapsulating function.

Third, this cured product is not as hard as the cured product of fluorene group-containing monoacrylates, and the glass transition point (Tg) thereof can be adjusted to 100° C. or less. In addition to this, the cured product has thermal stress relaxation properties. Therefore, LED chips are not subject to thermal stress, and the problems of deterioration of the chips due to encapsulation failure and breakage in the wiring due to thermal stress can be resolved.

Fourth, the refractive index of the cured product is greater than or equal to that of epoxy resins, being 1.55 or greater, preferably 1.58 or greater. Therefore, the light extraction efficiency from the sapphire substrate of LEDs can be improved.

Fifth, the cured product exhibits excellent heat resistance and light resistance, so that the transparency of the cured product can be maintained. Therefore, according to the cured product, when a high intensity LED is encapsulated therewith, the change in the amount of light emitted over time can be reduced.

BRIEF DESCRIPTION OF THE DRAWINGS

FIG. 1 is a graph showing the relationship between the refractive index of resin compositions and the mixing weight ratio of a monofunctional acrylate to a fluorene group-containing acrylate; and FIG. 2 is a graph showing the relationship between the glass transition point (Tg) of cured products and the mixing weight ratio of the monofunctional acrylate to the fluorene group-containing acrylate.

DETAILED DESCRIPTION OF THE PREFERRED EMBODIMENTS

Hereinafter, the present invention will be described in detail. In the following description, (meth)acrylate means acrylate or methacrylate.

A resin composition of the present invention contains a fluorene group-containing (meth)acrylate represented by the following formula (1):

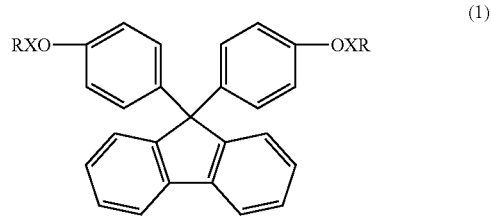

wherein X is —(CH$_2$CH$_2$O)$_n$— or —(CH$_2$CH$_2$O)$_n$—CH$_2$CH(OH)CH$_2$O— with n being 1 to 5 and R is an acrylic or methacrylic group.

The compound of formula (1) has a refractive index of 1.57 to 1.62 before curing and 1.58 to 1.65 after curing. Therefore, the compound of formula (1) has a refractive index greater than or equal to that of epoxy resins and exhibits excellent heat resistance and light resistance. In the formula (1), n larger than 5 is not preferred since the refractive index becomes too small.

A commercially available product may be used as the (meth)acrylate of formula (1). For example, there may be used 9,9'-bis(4-(2-acryloxyethoxyphenyl)fluorene) represented by the following formula (1 a):

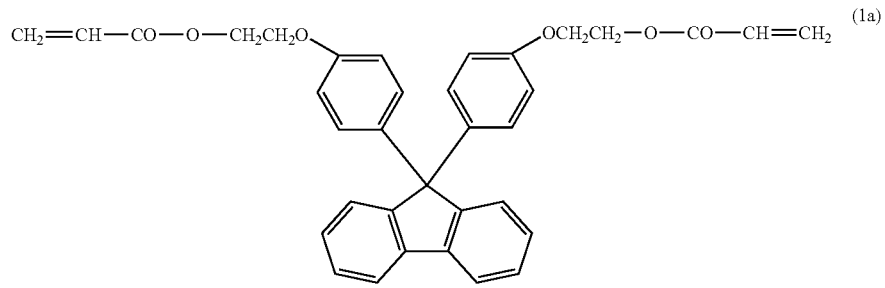

(Osaka Gas Chemicals Co., Ltd., BPEF-A, refractive index: 1.614) or 9,9'-bis(4-(2-(3-acryloyl-2-hydroxypropoxy)ethoxy)phenyl)fluorene represented by the following formula (1b):

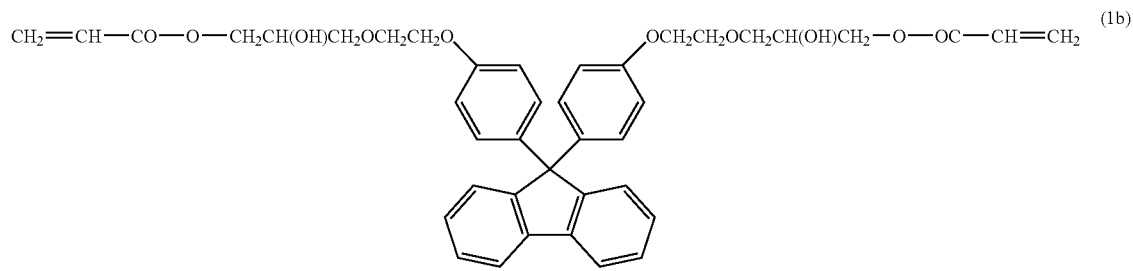

(Osaka Gas Chemicals Co., Ltd., refractive index: 1.574).

The resin composition of the present invention may contain one or more types of the fluorene group-containing (meth)acrylates of formula (1).

The fluorene group-containing (meth)acrylate of formula (1) itself has a high viscosity and therefore is not suitable for applications such as thin-film coating, printing, injection and the like. Hence, in the present invention, one of the following monofunctional (meth)acrylates is also used: a monofunctional (meth)acrylate represented by the following formula (2); and a monofunctional (meth)acrylate represented by the following formula (3):

$$A-Y-X \quad (2)$$

wherein A is an acrylic or methacrylic group, X is a phenyl group, a cumylphenyl group, a biphenyl group, a terphenyl group, or a polycyclic aromatic hydrocarbon group, and Y is $-(CH_2CH_2O)_n-$ or $-(CH_2CH_2CH_2O)_n-$ with n being 1 to 5 or $-(CH_2CH_2O)_{n1}-(CH_2CH_2CH_2O)_{n2}-$ with n1+n2 being 2 to 5; and $$A-Y-X-R_m \quad (3)$$

wherein A is an acrylic or methacrylic group, X is a phenyl group, a cumylphenyl group, a biphenyl group, a terphenyl group, or a polycyclic aromatic hydrocarbon group, Y is $-(CH_2CH_2O)_n-$ or $-(CH_2CH_2CH_2O)_n-$ with n being 1 to 5 or $-(CH_2CH_2O)_{n1}-(CH_2CH_2CH_2O)_{n2}-$ with n1+n2 being 2 to 5, R is $CH_3$, Br, or I, and m is 1 to 6.

In the formulas (2) and (3), examples of the polycyclic aromatic hydrocarbon group represented by X include naphthalene, dinaphthalene, anthracene, pyrene and the like.

A commercially available product may be used as the monofunctional (meth)acrylate of formula (2) or (3). For example, there may be used paracumylphenoxyethyl acrylate represented by

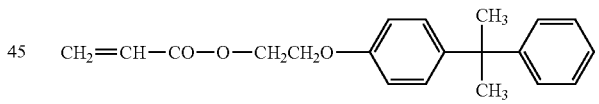

(TOAGOSEI CO., LTD., ARONIX M110, refractive index of monomer: 1.5542, viscosity: 125 mPa), 2-(2-acryloxyethoxy)biphenyl represented by

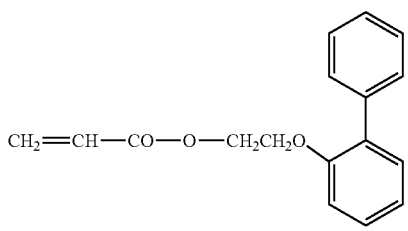

(TOAGOSEI CO., LTD., TO1463, refractive index of monomer: 1.5785, viscosity: 125 mPa), or phenoxyethyl acrylate represented by

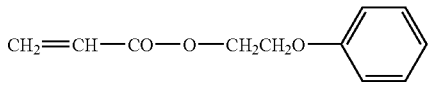

(OSAKA ORGANIC CHEMICAL INDUSTRY LTD, Viscoat V192, polymer Tg: −22° C., refractive index of monomer: 1.519, viscosity: 9.7 mPa).

In the present invention, one type of the monofunctional (meth)acrylates of formulas (2) and (3) or a suitable combination of two or more thereof may be used.

The monofunctional (meth)acrylate of formula (2) or (3) has a viscosity (as measured by an E-type viscometer at 25° C.) ranging from several tens to several thousands Pa. Furthermore, a resin composition prepared by mixing the monofunctional (meth)acrylate of formula (2) or (3) with the above fluorene group-containing (meth)acrylate has a viscosity of 100 to 100000 mPa which is suitable for applications such as thin-film coating, printing, injection and the like.

The monofunctional (meth)acrylate of formula (2) or (3) has a benzene skeleton and has good compatibility with the fluorene group-containing (meth)acrylate of formula (1). Moreover, the monofunctional (meth)acrylate of formula (2) or (3) has a high refractive index, being 1.5 or greater. Hence, even when the amount of this monofunctional (meth)acrylate to be mixed with the fluorene group-containing (meth)acrylate of formula (1) is increased, the refractive index of the final cured product can be maintained at a high value. Therefore, the amount of the monofunctional (meth)acrylate of formula (2) or (3) to be mixed with the fluorene group-containing (meth)acrylate of formula (1) can be flexibly changed. A specific amount to be mixed can be appropriately determined according to the viscosity, refractive index, and the like that is necessary for the resin composition obtained by mixing the above monofunctional (meth)acrylate with the fluorene group-containing (meth)acrylate of formula (1). For example, when a high heat resistance of approximately 150° C. for around 240 hours is required, it is preferable that the mixing ratio of the monofunctional (meth)acrylate of formula (2) or (3) to the fluorene group-containing (meth)acrylate of formula (1) be in the range of approximately 0.2:1 to 1:1. When a large amount of the monofunctional (meth)acrylate of formula (2) or (3) is used, the heat resistance is reduced.

In order to adjust the glass transition point (Tg) of the cured product to 100° C. or less and to impart sufficient thermal stress relaxation properties to the cured product, it is preferable that the amount by weight (W1) of the monofunctional (meth)acrylate of formula (2) or (3) and the amount by weight (W0) of the fluorene group-containing (meth)acrylate of formula (1) to be mixed together be adjusted such that the ratio (W1/W0) is 0.5 or greater.

Moreover, in this case, when the refractive index of the resin composition is adjusted to 1.58 or greater, the mixing weight ratio of the monofunctional (meth)acrylate of formula (2) or (3) to the fluorene group-containing (meth)acrylate of formula (1) is adjusted to preferably fall within the range of 0.2:1 to 2:1, and more preferably within the range of 0.5:1 to 1:1.

The combined use of the fluorene group-containing (meth)acrylate of formula (1) and the monofunctional (meth)acrylate of formula (2) or (3) allows the adjustment of not only the refractive index and other physical properties of the cured product but also the transparency, light resistance, curing rate, and the like.

If necessary, the resin composition of the present invention may contain various monomers in order to adjust the curing rate and viscosity of the composition and to also adjust the physical properties of the cured product, such as the refractive index, transparency, light resistance, heat resistance and the like. However, it is preferable that the various monomers included in the resin composition not contain sulfur as such monomers may cause a problem with regard to yellowing of the final resin composition due to heat.

Preferred examples of the monomers which can be contained in the resin composition of the present invention include aromatic vinyl monomers, such as styrene and the like, which are added in order to reduce the viscosity.

Moreover, in order to reduce the Tg of the cured product and to impart flexibility to the cured product, a monomer specifically intended to reduce the Tg of the resin composition may be added. Examples of such a monomer include butyl acrylate, 2-ethylhexyl acrylate, 2-methoxy acrylate, 3-methoxy acrylate and the like. These monomers normally have a refractive index of 1.45 or less. Hence, when a large amount of these monomers are added, the refractive index of the cured product of the present invention cannot be adjusted to 1.55 or greater. Therefore, it is preferable that the amount of these monomers to be mixed be usually 50% by weight or less.

In order to improve the transparency of the cured product, a monomer specifically intended to reduce the cut-off frequency may also be mixed into the resin composition. By reducing the cut-off frequency, the cured product becomes transparent to the UV light and blue light emitted by an LED, and the UV and blue light is not absorbed by the cured product. Therefore, the loss of luminance can be prevented, and the deterioration of the cured product due to the light can also be prevented. Hence, the transparency of the cured product can be stably maintained for a long period of time. Examples of such a monomer include cyclohexyl (meth)acrylate, dicyclopentenyl (meth)acrylate, tricyclodecanyl (meth)acrylate, isobornyl (meth)acrylate, adamantyl (meth)acrylate and the like.

As a curing agent for the resin composition of the present invention, a radical curing agent such as a peroxide or an azo compound, a UV curing agent, or the like may be used. The amount of the curing agent to be mixed is preferably in the range of 0.1 to 5 parts by weight with respect to 100 parts by weight of the total amount of the monomers used.

Moreover, in order to further increase the refractive index of the cured product, high-refractive index ultra-fine particles may be added to the resin composition of the present invention. The high-refractive index ultra-fine particles are transparent fine particles composed of a metal oxide such as titanium oxide, zirconium oxide, zinc oxide, aluminum oxide, or magnesium oxide. These high-refractive index ultra-fine particles have a refractive index of 1.6 or greater and a diameter of 20 nm or less, and more preferably, a diameter of 9 nm or less (single-nano size) Preferably, the surface of the high-refractive index ultra-fine particles is subjected to hydrophobic treatment.

In addition to this, a polymerization inhibitor and other various additives may be added to the resin composition of the present invention. For example, 25 to 1000 ppm of hydroquinone, methoquinone, BHT, or the like may be added to the resin composition as the polymerization inhibitor. Furthermore, silicon oxide fine particles in the form of an aerosol and the like may be added to the resin composition as a thixotropy-imparting agent. Moreover, a coloring dye, a YAG phosphor, or the like may be added in order to convert the wavelength of the light emitted from an LED.

The resin composition of the present invention can be obtained as a liquid composition by mixing the fluorene group-containing (meth)acrylate of formula (1) with the monofunctional (meth)acrylate of formula (2) or (3) and, if necessary, other components by means of a routine method.

This resin composition can be cured by heating it to a temperature of 80 to 150° C., or by applying UV light. The resin composition of the present invention can be suitably used as an optical encapsulating curable resin composition for encapsulating optical devices such as optical discs, light-emitting devices such as LEDs, lasers and the like. Therefore, the present invention includes optical devices such as light-emitting devices encapsulated with the resin composition of the present invention.

EXAMPLES

Hereinafter, the present invention is described in detail by way of Examples.

Example 1

(1) Preparation of the Resin Composition 80 parts by weight of 9,9-bis(4-(2-acryloxyethoxy)phenyl) fluorene (Osaka Gas Chemicals Co., Ltd., product name: BPEF-A) was mixed with 20 parts by weight of paracumylphenoxyethyl acrylate (TOAGOSEI CO., LTD., product name: ARONIX M110), and the mixture was uniformly stirred at 60° C. and then cooled to 40° C. Subsequently, 1 part by weight of a curing agent (product of NOF CORPORATION, PERHEXA O) was added and uniformly dispersed by means of a planetary mixer, whereby a resin composition was obtained.

(2) Production of Cured Product Sheet

The resin composition obtained in (1) was sandwiched between two mold-releasing films composed of PET. After the thickness of the resin composition was adjusted, the resin composition was then heat-treated in an oven at 80° C. for 1 hour in order to cure it. Subsequently, the resin composition was cooled to room temperature, and the mold-releasing films were then removed, whereby a sheet of the cured product having a thickness of 0.5 mm was obtained.

(3) Evaluation

The above-described resin composition and the sheet of cured product were evaluated as follows. The results are shown in Table 1.

(3-1) Viscosity

The viscosity of the resin composition was measured by means of an E type viscometer (25° C.).

(3-2) Refractive Index

The refractive index of the above-described resin composition and sheet of the cured product were measured by means of an Abbe refractometer (Na D line (589 nm), 25° C.)

(3-3) Cut-Off Wavelength

The sheet of cured product was used as a test piece, and the cut-off wavelength thereof was determined by means of a spectrophotometer. The results showed that the cut-off wavelength of the sheet of cured product was 325 nm. It should be noted that it is necessary, in practical terms, that the cut-off frequency be sufficiently lower than 440±20 nm, which is the wavelength of the light emitted from a blue LED.

(3-4) Light Extraction Efficiency (Ratio of the Total Amount of Light Emitted)

First, the lens portion and encapsulating resin of a commercially available green LED (Luxeon, product of Lumileds) were removed to obtain an LED chip base portion (a bare chip and a base). Then, light was emitted from the LED chip base portion in an integrating sphere, and the current value was adjusted such that the total amount of light emitted was 17 lumens.

Subsequently, a mold having a semispherical recess with a diameter of 5 mm was prepared, and the above-described resin composition was poured into the recess. The LED chip base portion was placed face down on the resin composition such that the base portion came into contact with the resin composition. The mold with the LED chip base portion included therein was then heat-treated in an oven at 80° C. for one hour in order to cure the resin composition. The LED chip base portion, after cooling to room temperature, was then removed from the mold, whereby an LED having a transparent semispherical dome was obtained. Then, the total amount of light emitted was measured using an integrating sphere. The results showed that the total amount of light emitted was 38 lumens.

The light extraction efficiency was determined as the ratio of the total amount of light emitted by the thus-obtained LED element to that of the bare chip.

In the LED, the light extraction efficiency thereof increases as the refractive index of the resin forming the semispherical dome moves closer to the refractive index of the sapphire forming the LED chip substrate.

(3-5) Glass Transition Point (Tg)

The glass transition point of the above-described sheet of cured product was measured by means of an automatic dynamic viscoelastometer RHEOVIBRON(ORIENTEC Co., LTD, DDV-25FP).

(3-6) Shore-A Hardness

The Shore-A hardness (at room temperature) of the above-described sheet of cured product was measured according to ASTM D2240 by means of a type-A durometer.

(3-7) Light Resistance Test

A sheet of the above-described cured product was used as a test piece, and a light resistance test was performed for 96 hours according to JIS A1415 by means of a fade meter, and the change in color was visually observed.

(3-8) Heat Resistance Test

A sheet of the above-described cured product was used as a test piece, and a heat resistance test was performed in which the test piece was left to stand in air at 150° C. for 96 hours, and the change in transparency before and after the test was visually observed.

Examples 2 to 6

The same procedure as in Example 1 was repeated except that the amounts of 9,9-bis(4-(2-acryloxyethoxy)phenyl) fluorene and paracumylphenoxyethyl acrylate were changed as listed in Table 1 and that Irgacure I-651 (Ciba Specialty Chemicals) was used as the curing agent, to thereby prepare resin compositions. In addition to this, each of the obtained resin compositions was irradiated with light from a halogen lamp with a total light dose of 1 J/cm² in order to cure it, whereby a sheet of the cured product was produced. Then, the sheet of cured product was evaluated. The results are shown in Table 1.

Examples 7 to 11

The same procedure as in Example 2 was repeated except that 2-(2-acryloxyethoxy)biphenyl (product of TOAGOSEI CO., LTD., product name: T01463) was used in an amount listed in Table 1 in place of paracumylphenoxyethyl acrylate, to thereby prepare resin compositions. Then, a sheet of the cured product of each of the obtained resin compositions was produced and was evaluated. The results are shown in Table 1.

Examples 12 and 13

The same procedure as in Example 2 was repeated except that phenoxyethyl acrylate (OSAKA ORGANIC CHEMICAL INDUSTRY LTD, product name Viscoat V192) was used in an amount listed in Table 1 in place of paracumylphenoxyethyl acrylate, to thereby prepare acrylic compositions. Then, a sheet of the cured product of each of the obtained acrylic compositions was produced and was evaluated. The results are shown in Table 1.

Comparative Example 1

To 100 parts by weight of a commercially available bisphenol A type epoxy resin (Japan Epoxy Resins Co., Ltd., Epikote 828), 100 parts by weight of Rikacid MH700 (New Japan Chemical Co., ltd.) and 0.5 parts by weight of DBU-phenol salt (SAN-APRO Ltd.) were added. Then, the mixture was cured at 150° C. for 2 hours, and the evaluations as in Example 1 were performed. The results are shown in Table 1.

Comparative Example 2

A commercially available polydimethyl silicone-based two-part silicone resin of an addition reaction type (Dow Corning Toray Silicone Co., Ltd., CY-52276) was evaluated as in Example 1. The results are shown in Table 1.

Comparative Example 3

To 9,9-bis(4-(2-acryloxyethoxy)phenyl)fluorene (product of Osaka Gas Chemicals Co., Ltd., product name: BPEF-A) used in each of the Examples, 1.0 part by weight of PERHEXA O (NOF CORPORATION) serving as the curing agent was added, and the obtained single monomer composition and the cured product thereof were evaluated as in Example 1. The results are shown in Table 1.

In addition to this, 1.0 part by weight of PERHEXA O (NOF CORPORATION) serving as the curing agent was added to each of paracumylphenoxyethyl acrylate (product of TOAGOSEI CO., LTD., product name: ARONIX M110) used in Examples 1 to 6, 2-(2-acryloxyethoxy)biphenyl (product of TOAGOSEI CO., LTD., product name: T01463) used in Examples 7 to 11, and phenoxyethyl acrylate (OSAKA ORGANIC CHEMICAL INDUSTRY LTD, product name: Viscoat V192) used in Examples 12 and 13. Then, each of the obtained single monomer compositions and each of the cured products thereof were evaluated as in Example 1. The results are shown in Table 2.

Furthermore, the relationship between the refractive index of the resin composition of each Example and the mixing weight ratio of the monofunctional acrylate to the fluorene group-containing acrylate is shown in FIG. 1. In addition to this, the relationship between the glass transition point (Tg) of the cured product of each Example and the mixing weight ratio of the monofunctional acrylate to the fluorene group-containing acrylate is shown in FIG. 2.

TABLE 1

| | Resin component (weight ratio) | | | Viscosity (mPa) | Refractive index (composition) | Refractive index (cured product) | Light extraction efficiency | Tg (° C.) VI-BRON | Shore-A hardness (room temperature) | Light resistance | Heat resistance (transparency) |
|---|---|---|---|---|---|---|---|---|---|---|---|---|
| Ex. 1 | Fluorene | 80 | Paracumyl- | 20 | 64000 | 1.602 | 1.612 | 2.24 | | | No change | No change |
| Ex. 2 | group- | 67 | phenoxy- | 33 | 43000 | 1.593 | 1.604 | | 107.1 | 97 | No change | No change |
| Ex. 3 | containing | 50 | ethyl | 50 | 4500 | 1.583 | 1.595 | | 88.4 | 93 | No change | No change |
| Ex. 4 | (meth)- | 33 | acrylate | 67 | 2300 | 1.574 | 1.584 | | | 95 | No change | No change |
| Ex. 5 | acrylate | 17 | (*2) | 83 | | 1.562 | | | 42.1 | | No change | No change |
| Ex. 6 | (*1) | 9 | | 91 | | 1.558 | | | 32.1 | 53 | No change | No change |
| Ex. 7 | | 75 | 2-(2- | 25 | 91000 | 1.608 | 1.618 | | 101.8 | | No change | No change |
| Ex. 8 | | 67 | Acryloxy- | 33 | | 1.602 | | | 101.8 | | No change | No change |
| Ex. 9 | | 50 | ethoxy)bi- | 50 | 5000 | 1.596 | 1.609 | | 85.1 | 95 | No change | No change |
| Ex. 10 | | 33 | phenyl (*3) | 67 | | 1.589 | | | 62.8 | | No change | No change |
| Ex. 11 | | 10 | | 90 | | 1.581 | | | 48.5 | 72 | No change | No change |
| Ex. 12 | | 67 | Phenoxyethyl acrylate | 33 | | 1.579 | | | 92.8 | | No change | No change |
| Ex. 13 | | 50 | (*4) | 50 | 2800 | 1.564 | 1.578 | | 66.7 | 95 | No change | No change |
| Comp. Ex. 1 | Epoxy resin | | | | 4000 | 1.566 | 1.574 | 2.06 | | | Slightly yellowed | Yellowed |
| Comp. Ex. 2 | Two-part silicone resin | | | | Part A: 1000 Part B: 750 | 1.410 | 1.415 | 1.53 | | | No change | No change |

TABLE 1-continued

|  | Resin component (weight ratio) | Viscosity (mPa) | Evaluation | | | | | | |
|---|---|---|---|---|---|---|---|---|---|
|  |  |  | Refractive index (composition) | Refractive index (cured product) | Light extraction efficiency | Tg (° C.) VIBRON | Shore-A hardness (room temperature) | Light resistance | Heat resistance (transparency) |
| Comp. Ex. 3 | Fluorene group-containing (meth)acrylate (*1) | syrup | 1.614 | 1.625 |  |  | 98 | No change | No change |

(*1) 9,9-Bis(4-(2-acryloxyethoxy) phenyl)fluorene (Osaka Gas Chemicals Co., Ltd., product name: BPEF-A)
(*2) Paracumylphenoxyethyl acrylate (TOAGOSEI CO., LTD., product name: ARONIX M110)
(*3) 2-(2-Acryloxyethoxy)biphenyl (TOAGOSEI CO., LTD., product name: T01463)
(*4) Phenoxyethyl acrylate (OSAKA ORGANIC CHEMICAL INDUSTRY LTD, product name: Viscoat V192)

TABLE 2

| Resin component | Evaluation | | | | |
|---|---|---|---|---|---|
|  | Viscosity (mPa) | Refractive index (composition) | Tg (° C.) DSC | Tg (° C.) VIBRON | Shore-A hardness (room temperature) |
| Fluorene group-containing (meth)acrylate (*1) | syrup | 1.614 | 153.1 |  | 98 |
| Paracumylphenoxyethyl acrylate (*2) | 125 | 1.5542 | 17.9 |  | 64 |
| 2-(2-Acryloxyethoxy)-biphenyl (*3) | 125 | 1.5785 | 15.0 | 43.5 | 70 |
| Phenoxyethyl acrylate (*4) | 9.7 | 1.519 | −22.0 |  | 0 |

As can be seen from Table 1, the cured product of the single monomer composition (Comparative Example 3) of 9,9-bis (4-(2-acryloxyethoxy)phenyl)fluorene had high refractive index and exhibited excellent light resistance. However, the composition was syrup-like, and therefore the viscosity of the composition was too high to be measured. Hence, the handleability when used as an encapsulating resin was poor. Furthermore, as can be seen from Table 2, the glass transition point (Tg) was high, and the thermal stress relaxation properties were poor.

However, the cured product of each of the Examples had a refractive index of 1.55 or greater, which is equivalent to that of epoxy resins, and exhibited excellent light resistance. Furthermore, the viscosity of the resin composition fell within the range suitable for use as an encapsulating resin. Also, the glass transition point (Tg) of the cured product was lower than that of the cured product of the single monomer of 9,9-bis(4-(2-acryloxyethoxy)phenyl)fluorene, and the cured product was excellent in thermal stress relaxation properties.

In particular, as can be seen from FIG. 2, the glass transition point (Tg) of the cured product can be adjusted to 100° C. or less by adjusting the mixing weight ratio of the monofunctional (meth)acrylate to the fluorene group-containing (meth) acrylate to 0.5 or more. Furthermore, as can be seen from FIG. 1, the refractive index of the resin composition can be adjusted to 1.58 or higher by adjusting the mixing weight ratio of C:paracumylphenoxyethyl acrylate and B:2-(2-acryloxyethoxy)biphenyl to the fluorene group-containing (meth) acrylate to 0.2 to 2.

Furthermore, as can be seen from Table 1, when 2-(2-acryloxyethoxy)biphenyl was used as the monofunctional acrylate (Examples 7 to 11), the refractive index of the cured product was higher than that when paracumylphenoxyethyl acrylate was used (Examples 1 to 6).

The cured product of each of the Examples had a Shore-A hardness less than that of the cured product of the single composition of 9,9-bis(4-(2-acryloxyethoxy)phenyl)fluorene. Thus, it was found that the hardness of the cured product was reduced.

The light extraction efficiency in Example 1 was 2.24, which was approximately 10% higher than that in Comparative Example 1. Hence, according to the present invention, unnecessary power consumption can be suppressed, and the heat dissipation can be improved. In addition to this, the amount of light emission can be increased.

The cured product of the epoxy resin of Comparative Example 1 had light extraction efficiency less than that of the Examples. In addition to this, yellowing was significantly found in the light resistance test and the heat resistance test. Thus, this epoxy resin is not preferable as an encapsulating resin for high intensity LEDs.

The cured product of the silicone resin of Comparative Example 2 had a low light extraction efficiency being 1.53. This is because the refractive index of the silicone resin is low and a semispherical shape cannot be maintained since the cured product of Comparative Example 2 is excessively soft.

The resin composition of the present invention is useful as an optical encapsulating resin composition for encapsulating optical devices such as optical discs, light-emitting devices such as LEDs, lasers and the like, is particularly useful as an encapsulating resin composition for use in high intensity LEDs.

An optical device such as a light-emitting device encapsulated with the resin composition of the present invention may be used in a wide variety of fields such as backlights of flat panels, traffic signals, lamps for advertising boards, headlamps for automobiles and the like.

The entire disclosure of the specification, summary, claims, drawings and abstract of Japanese Patent Application No. 2006-107529 filed on Apr. 10, 2006 is hereby incorporated by reference.

What is claimed is:

1. A curable resin composition comprising a fluorene group-containing acrylate or methacrylate represented by the following formula (1) and a monofunctional acrylate or methacrylate represented by the following formula (2) or (3):

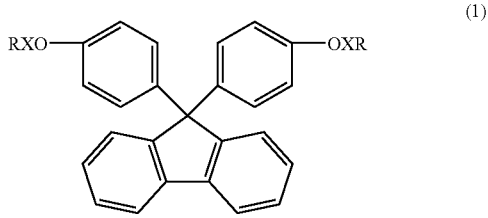

wherein X is $-(CH_2CH_2O)_n-$ or $-(CH_2CH_2O)_n-CH_2CH(OH)CH_2O-$ with n being 1 to 5 and R is an acrylic or methacrylic group;

wherein A is an acrylic or methacrylic group, X is a phenyl group, a cumylphenyl group, a biphenyl group, a terphenyl group, or a polycyclic aromatic hydrocarbon group, and Y is $-(CH_2CH_2O)_n-$ or $-(CH_2CH_2CH_2O)_n$, with n being 1 to 5 or $-(CH_2CH_2O)_{n1}-(CH_2CH_2CH_2O)_{n2}-$ with n1+n2 being 2 to 5; and

wherein A is an acrylic or methacrylic group, X is a phenyl group, a cumylphenyl group, a biphenyl group, a terphenyl group, or a polycyclic aromatic hydrocarbon group, Y is $-(CH_2CH_2O)_n-$ or $-(CH_2CH_2CH_2O)_n$, with n being 1 to 5 or $-(CH_2CH_2O)_{n1}-(CH_2CH_2CH_2O)_{n2}-$ with n1+n2 being 2 to 5, R is $CH_3$, Br, or I, and m is 1 to 6.

2. The curable resin composition according to claim 1, having a refractive index of 1.55 or greater.

3. The curable resin composition according to claim 1, having a refractive index of 1.58 or greater.

4. The curable resin composition according to claim 1, wherein a cured product prepared from the curable resin composition has a glass transition point of 100° C. or less.

5. The curable resin composition according to claim 1, wherein a mixing weight ratio of the monofunctional acrylate or methacrylate represented by the formula (2) or (3) to the fluorene group-containing acrylate or methacrylate represented by the formula (1) falls within a range of 0.2 to 2.

6. The curable resin composition according to claim 1, wherein the monofunctional acrylate represented by the formula (2) is paracumylphenoxyethyl acrylate or 2-(2-acryloxyethoxy)biphenyl.

7. The curable resin composition according to claim 1, comprising ultra-fine particles dispersed therein, the particles having a refractive index higher than that of a mixture of the fluorene group-containing acrylate or methacrylate represented by the formula (1) and the monofunctional acrylate or methacrylate represented by the formula (2) or (3).

8. An optical encapsulating curable resin composition comprising a curable resin composition according to claim 1.

9. A cured product prepared by curing a curable resin composition according to claim 1.

10. An optical device encapsulated with the optical encapsulating curable resin composition according to claim 8.

* * * * *